United States Patent [19]

Blair et al.

[11] Patent Number: 5,031,313
[45] Date of Patent: Jul. 16, 1991

[54] METHOD OF FORMING F.O.D.-RESISTANT BLADE

[75] Inventors: Lawrence W. Blair, Boxford; Robert A. Schaefer, North Reading, both of Mass.

[73] Assignee: General Electric Company, Lynn, Mass.

[21] Appl. No.: 505,625

[22] Filed: Apr. 6, 1990

Related U.S. Application Data

[62] Division of Ser. No. 312,093, Feb. 17, 1989, Pat. No. 4,961,686.

[51] Int. Cl.⁵ .............................. B21K 3/04; B23P 6/00
[52] U.S. Cl. .................................. 29/889.1; 29/889.7; 29/402.06
[58] Field of Search ................... 29/889, 889.1, 889.2, 29/889.23, 889.7, 402.01, 402.04, 402.05, 402.06, 402.09; 416/223 A, 223 R, 228, DIG. 2, DIG. 5; 415/181

[56] References Cited

U.S. PATENT DOCUMENTS

| | | | |
|---|---|---|---|
| 2,714,499 | 8/1955 | Warner | 416/228 |
| 3,989,406 | 11/1976 | Bliss | 415/1 |
| 4,012,172 | 3/1977 | Schwaar et al. | 416/228 |
| 4,639,991 | 2/1987 | Sharon | 29/402.19 X |

FOREIGN PATENT DOCUMENTS

| | | | |
|---|---|---|---|
| 2054549 | 5/1972 | Fed. Rep. of Germany | 29/889.7 |
| 1903642 | 8/1970 | Switzerland . | |
| 954573 | 8/1982 | U.S.S.R. . | |

*Primary Examiner*—Joseph M. Gorski
*Assistant Examiner*—S. Thomas Hughes
*Attorney, Agent, or Firm*—Francis L. Conte; Nathan D. Herkamp; Jerome C. Squillaro

[57] ABSTRACT

An improved gas turbine engine blade having increased resistance to foreign object damage is disclosed. The blade includes a swept-back leading edge portion in the tip region of the blade for improving resistance to tip curl due to foreign object impact.

A method of forming such a gas turbine engine blade from a blade having leading edge tip curl caused by foreign object damage is also disclosed.

12 Claims, 3 Drawing Sheets

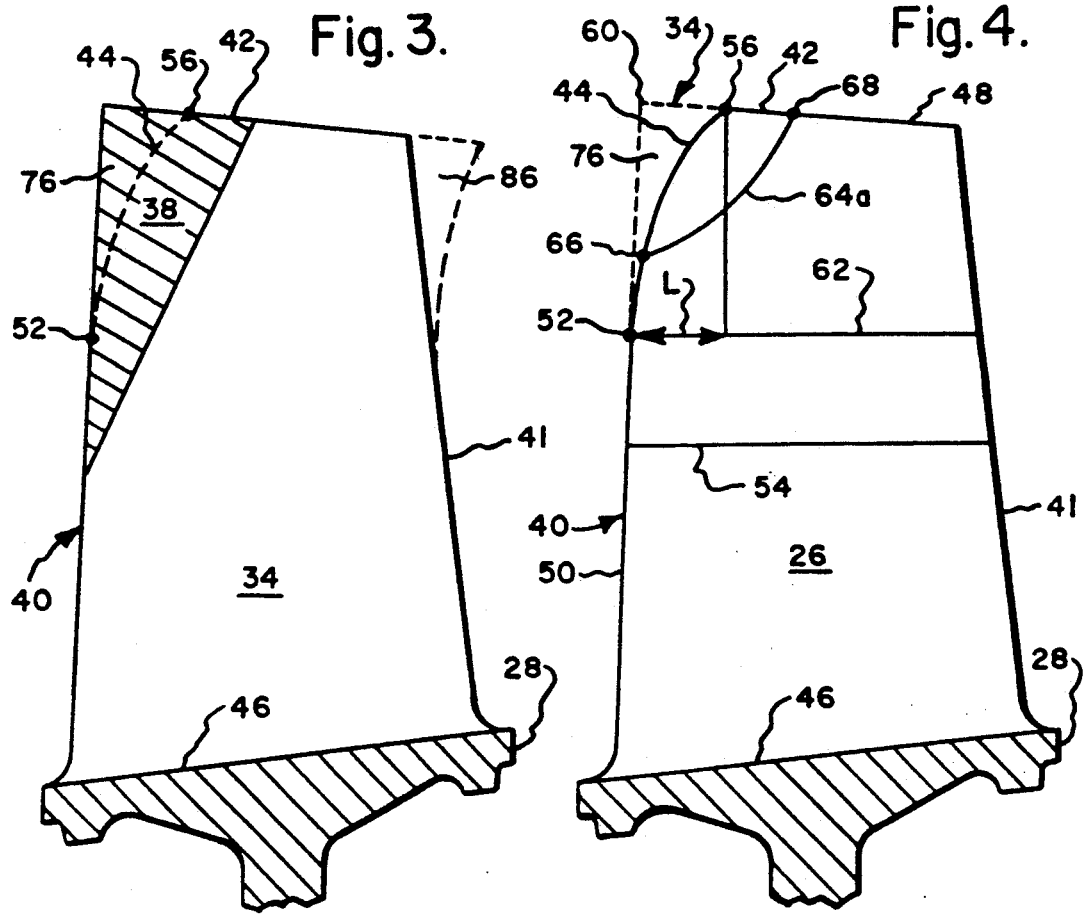
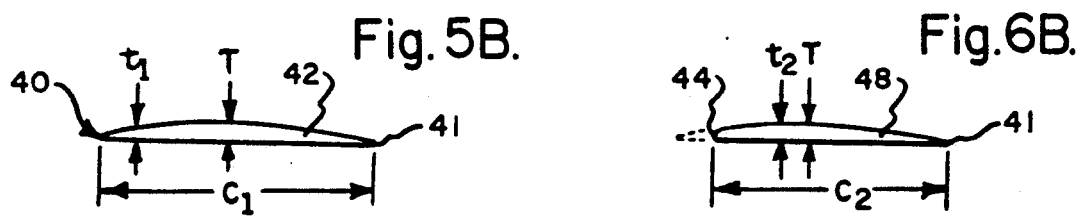
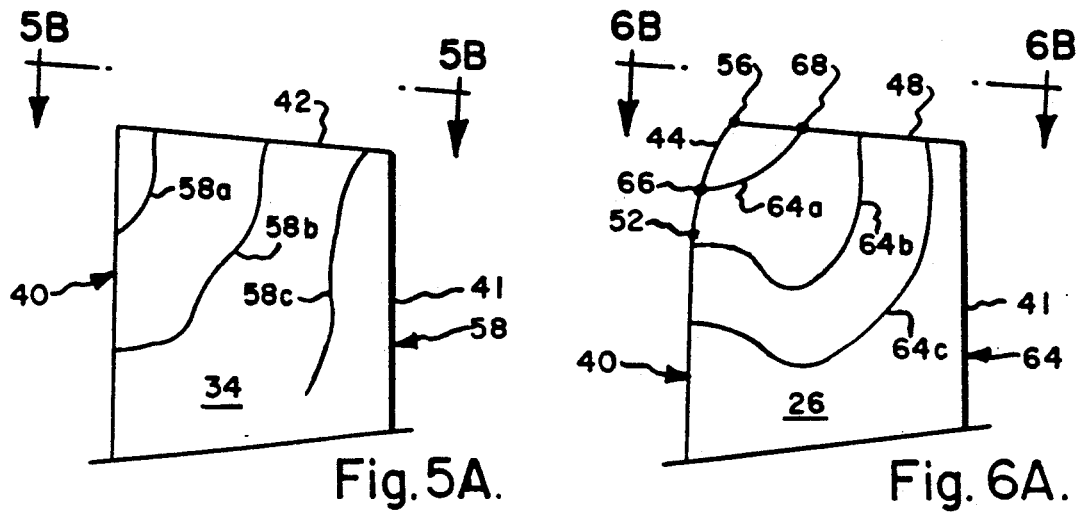

METHOD OF FORMING F.O.D.-RESISTANT BLADE

This is a division of application Ser. No. 312,093, filed Feb. 17, 1989, now U.S. Pat. No. 4,961,680.

BACKGROUND OF THE INVENTION

This invention relates generally to gas turbine engine compressors and, more specifically, to a compressor rotor first stage blade having improved resistance to foreign object damage (F.O.D.).

Gas turbine engines which power aircraft are subject to ingestion of foreign objects, such as ice, which may cause damage to the blades of the compressor rotor first stage. One type of damage which has been experienced causes the leading edge tip corner region of compressor stage one rotor blades to curl over due to impact by ice objects. It has been observed that ingested ice tends to travel primarily near the blade tips and near the compressor shroud, which is disposed immediately adjacent to the blade tips.

Blade F.O.D. in the form of such tip curl results in aerodynamic performance loss and additional maintenance and is therefore undesirable.

One manner known to increase FOD resistance is to increase blade thickness. However, this is undesirable for compressor blades designed for supersonic inlet flow conditions which are conventionally relatively thin for more efficient aerodynamic performance. The performance would decrease if the blades were made thicker for increasing FOD resistance.

Accordingly, an object of the present invention is to provide a new and improved gas turbine engine blade.

Another object of the present invention is to provide a gas turbine engine blade having improved resistance to foreign object damage.

Another object of the present invention is to provide a gas turbine engine blade having improved F.O.D. resistance without substantially adversely affecting aerodynamic performance of the blade.

Another object of the present invention is to provide a method of forming a blade having improved resistance to foreign object damage from a blade having tip curl due to foreign object damage.

SUMMARY OF THE INVENTION

The invention comprises a gas turbine engine blade including an airfoil portion bounded by a root and a tip spaced radially apart and a leading edge and trailing edge spaced axially apart with the leading and trailing edges extending from the root to the tip. The blade includes means for increasing foreign object damage resistance of the airfoil portion, which includes a swept-back leading edge.

The invention also includes a method of forming such a gas turbine engine blade from a blade having leading edge tip curl caused by foreign object damage.

BRIEF DESCRIPTION OF THE DRAWINGS

The novel features believed characteristic of the invention are set forth in the claims. The invention, in accordance with preferred embodiments, together with further objects and advantages thereof, is more particularly described in the following detail description taken in conjunction with the accompanying drawing in which:

FIG. 3 is a schematic side view of a conventional compressor blade illustrating a leading edge tip region of experienced tip curl.

FIG. 4 is a schematic side view of the blade illustrated in FIG. 1 in accordance with one embodiment of the present invention.

FIG. 5A is a schematic view of the conventional blade illustrated in FIG. 3 showing a three-stripe mode shape associated with a respective natural frequency of vibration.

FIG. 5B is a top view of the blade illustrated in FIG. 5A taken along line 5B—5B.

FIG. 6A is a schematic view of the blade illustrated in FIG. 4 in accordance with one embodiment of the present invention illustrating a three-stripe mode shape associated with a respective natural frequency of vibration.

FIG. 6B is a top view of the blade illustrated in FIG. 6A taken along line 6B—6B.

DETAIL DESCRIPTION

Figure 1:
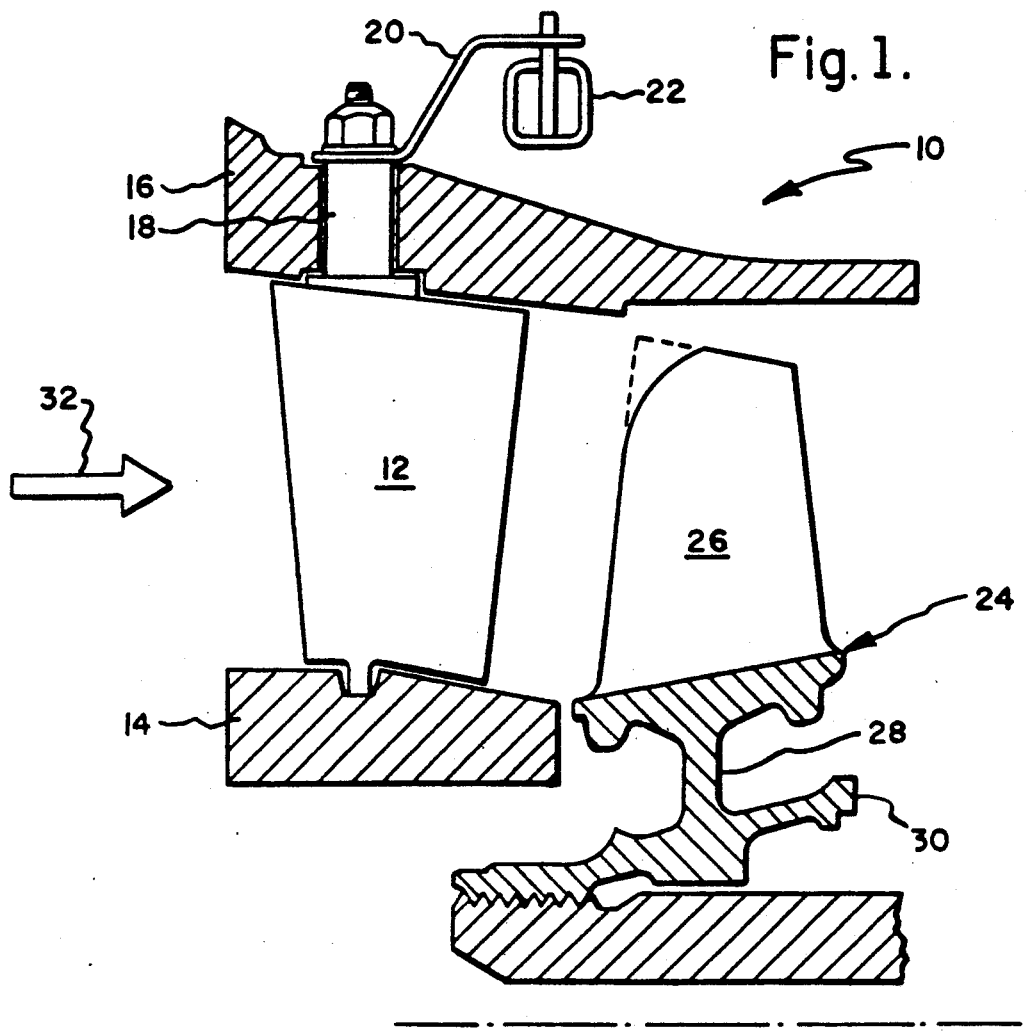
FIG. 1 is a partly sectional view of a first stage of a compressor section of a gas turbine engine in accordance with one embodiment of the present invention.

Illustrated in FIG. 1 is a compressor first-stage 10 of a gas turbine engine in accordance with an exemplary, preferred embodiment of the invention. The first stage 10 includes a plurality of circumferentially spaced conventional variable inlet guide vanes (IGVs) 12. The IGVs 12 are conventionally rotatably mounted at radially inner ends thereof to an inner casing 14 and conventionally rotatably mounted at radially outer ends thereof to an outer casing or shroud 16. Each IGV 12 includes a spindle 18 at its radially outer end which extends through the outer casing 16, which is fixedly connected to an actuating lever 20. The levers 20 are rotatably connected to an arcuate unison ring 22. The IGVs 12 are conventional and are conventionally actuated by the unison ring 22 for rotation therewith.

The compressor first-stage 10 also includes a first-stage rotor 24 which, in the exemplary embodiment illustrated, is an integral bladed disk assembly (i.e. blisk). The blisk 24 includes a plurality of circumferentially spaced airfoil portions or blades 26 formed integrally to a rotor disk 28. The disk 28 is conventionally attached through a conventional curvic coupling 30 to a compressor second stage (not shown) and is powered by a conventional turbine (not shown). Although, in the preferred embodiment, the airfoil portions 26 are formed integrally with the disk 28, the invention is also applicable to conventional airfoil portions removably secured to a rotor disk, such as, for example, in conventional axial dovetail slots therein.

In operation, air 32 is channeled through the IGVs 12 to the first-stage rotor 24 for compression. In one embodiment, the rotor 24 rotates at about 42,000 rpm with the flow of the air 32 thereover being greater than Mach 1 for substantially the entire length of the airfoil portion 26.

Figure 2:
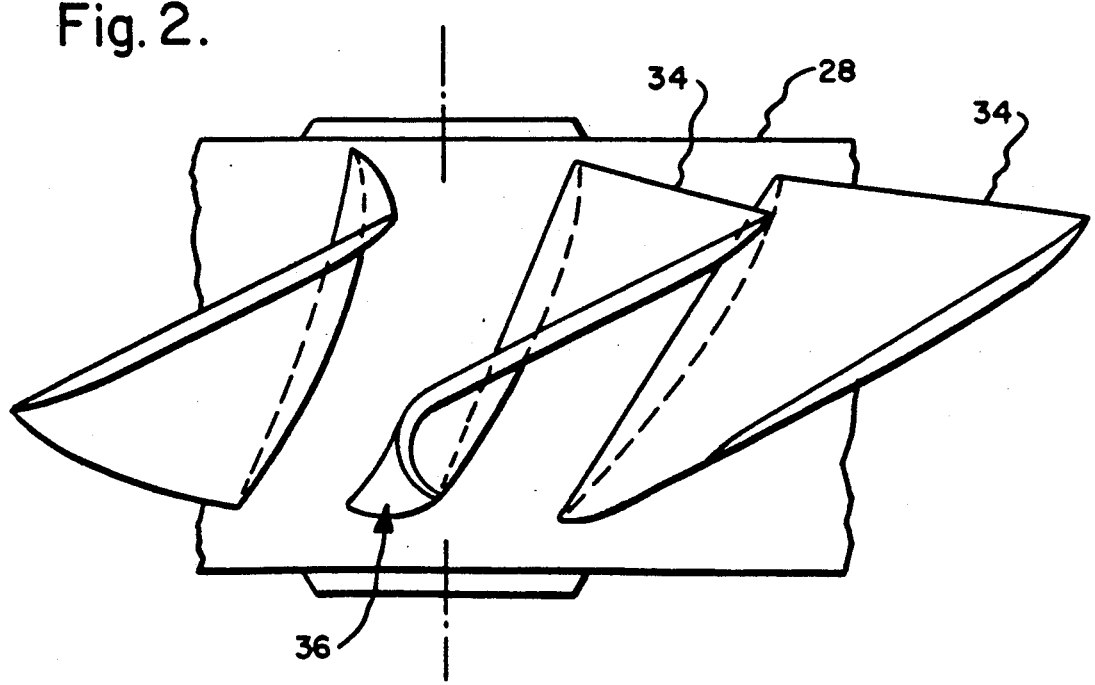
FIG. 2 is an overhead perspective view of a section of a conventional compressor first stage rotor illustrating blade tip curl on a single blade.

Illustrated in FIG. 2 is the rotor disk 28 having conventional first-stage compressor blades 34, one of which is shown with a leading edge tip curl 36 formed by impact of a foreign object such as ice. The tip curl 36 is undesirable, since it changes the aerodynamic profile of the blade 34.

Illustrated in FIG. 3 is the conventional compressor blade 34 having a leading edge tip portion or region 38 (shown in cross-hatch) showing the area of experienced tip curl from ice impact for a particular blade. Various amounts of tip curl were experienced extending from a leading edge 40 rearwardly toward a trailing edge 41 up to about 30% of the chord length extending therebetween and from a tip 42 radially inwardly up to about 57% of the radial span of the airfoil portion.

In an attempt to resolve the Problem of tip curl, it has been discovered that the incorporation of a relatively small swept-back leading edge portion 44, indicated in dashed line in FIG. 3, in accordance with one embodiment of the present invention can provide means for substantially improving or increasing resistance to tip curl caused by foreign objects such as ice.

More specifically, and referring to FIG. 4, a gas turbine engine blade in the form of the blisk airfoil portion 26 integrally formed with the rotor disk 28 is shown in more detail. In the preferred embodiment of the invention illustrated in FIG. 4, the airfoil portion 26 is identical to the conventional airfoil portion 34 illustrated in FIG. 3, except for the swept-back leading edge portion 44. FIG. 4 illustrates in dashed line, labeled 34, the portion of the original airfoil 34 removed for creating the airfoil portion 26 illustrated in FIG. 4.

The airfoil portion 26 is bounded by a root 46 and a tip 48, which are radially spaced apart, and is further bounded by the leading edge 40 and the trailing edge 41, which are axially, or transversely, spaced apart. The leading and trailing edges 40 and 41 extend from the root 46 to the tiP 48. The swept-back leading edge portion 44 forms a first, or tip, portion of the leading edge 40, with a complementary, or second, leading edge portion 50 extending from the first portion 44 to the root 46.

More specifically, the leading edge second portion 50 extends from the root 46 to a first leading edge point 52 disposed radially outwardly of about a mid span 54 of the airfoil portion 26, and the swept-back leading edge portion 44 extends from the first point 52 to a second point 56 at the airfoil tip 42.

To appreciate more fully the type of compressor blade subject to tip curling and the preferred shape and extent of the swept-back leading edge portion 44 required for obtaining improved resistance to tip curling requires an examination of the conventionally determinable mode shapes of the various natural frequencies of vibration, for uncovering the one which is illustrated in FIGS. 5A and 5B. More specifically, FIG. 5A illustrates schematically a three-stripe mode shape 58 of the conventional airfoil portion 34 occurring at an intermediate natural frequency of about 12,020 Hertz for one embodiment tested.

The mode shape 58 illustrated in FIG. 5A includes three conventionally known nodal lines 58a, 58b, and 58c, which represent the lines of zero or no displacement during vibration. The nodal line 58a closest to the leading edge 40 forms a relatively small triangular shape at the leading edge and tip of the airfoil portion 34 The nodal line 58a corresponds generally with the line about which tip curl such as that illustrated in FIG. 2 has been experienced.

FIG. 5B is a top view of the airfoil portion 34 illustrated in FIG. 5A and shows that the airfoil tip 42 has a chord length $C_1$ and a maximum transverse thickness T near the center of the tip 42. Also, the tip 42 has a thickness $t_1$ at the point where nodal line 58a occurs at the tip 42, which is substantially less than the maximum thickness T. The thickness $t_1$ is about 0.024 inch, and the ratio $T/C_1$ is about 0.032, which represents a relatively thin airfoil portion 34.

Calculations made after an examination of high-speed motion pictures for the duration of impact of an ice object's impacting against the tip 42 of the airfoil portion 34 operated at about 42,000 rpm revealed that the ice object contacted the airfoil portion 34 during only the first quarter to half cycle of blade vibration, which caused an efficient energy transfer in this mode shape. This observation would appear to substantiate the mechanism for obtaining a substantially large amount of damage, i.e. tip curl, from relatively small ice objects weighing about 1 ½ to 3 grams in a relatively thin blade having a tip maximum thickness to chord ratio T/C of about 0.032 and a three-stripe mode shape including a nodal line 58a disposed near the thin leading edge region.

Accordingly, the extent and shape of the swept-back leading edge portion 44 are predeterminedly selected to reduce, and potentially eliminate, the energy transfer excitation mechanism inherent in a blade including a mode shape such as that illustrated in FIGS. 5A and 5B, which would otherwise promote efficient transfer of energy from foreign objects for curling blade tips.

Although tip curl experience as indicated in the region 38 illustrated in FIG. 3 includes a relatively large tip corner region of the airfoil portion 34, it has been discovered that the use of a relatively small swept-back leading edge portion 44 is effective for reducing and, in an embodiment tested, eliminating tip curl due to ice ingestion without incurring an unacceptably large decrease in aerodynamic performance thereby.

More specifically, and with reference to the original airfoil Portion 34 as illustrated in dashed line in FIG. 4, an axial cutback of the leading edge of about 0.25 inch along the tip 42 from a radially outermost leading edge tip point 60 to the second point 56 and a radial cutback from the leading edge tip point 60 radially inwardly along the airfoil span of about 0.65 inch to the first leading edge point 52 were predeterminedly selected. In the preferred embodiment, the swePt-back leading edge portion 44 is arcuate and is smoothly blended at the first leading edge point 52. The 0.25 inch axial cutback or position of the second point 56 aft of the first point 52 as indicated at L in FIG. 4 represents about 15% of a first section chord length 62 extending from the leading edge 40 to the trailing edge 41 in a radial plane extending through the first leading edge point 52 to the trailing edge 41 along a single radius. The 0.65 inch radial cutback from the leading edge tip point 60 represents about 30% of the leading edge span length from the leading edge tip point 60 to the root 46.

The 15% axial cutback represents about half of the experienced tip curl in the axial direction of about 30% as shown in FIG. 3, and the 30% radial cutback also represents about half of the experienced tip curl in the radial direction of about 57% as shown in FIG. 3.

In yet another embodiment of a similar blade, a 0.85 inch radial cutback was made radially inwardly from the leading edge tip point 60, which represents about a 40% radial cutback of the leading edge span length from the tip point 60.

In both embodiments, the axial and radial cutbacks are preselected, by iteration for example, to determine the least amount of cutback within the tip curl region 38 required for increasing tip curl resistance without obtaining unacceptable aerodynamic performance loss.

Although a relatively small portion 76 of the leading edge region has been removed as illustrated in FIGS. 3 and 4, relative to the extent of tip curl experience as illustrated in the tip curl region 38 shown in FIG. 3, a substantial increase in tip curl resistance to ice ingestion was shown in tests. In particular, although ice objects of only about 1 ½ to 3 grams were previously effective for causing substantial tip curl, the improved airfoil portion 26 was subjected to ice objects of about 8 grams in mass and up to about one inch in span, which represents the maximum size of ice which could fit between adjacent IGVs 12 and no tip curl was observed. Aerodynamic performance loss associated with the swept-back leading edge portion 44 was relatively minor and acceptable.

Accordingly, the swept-back leading edge 44 may be selected to extend within the region of experienced tip curl for the identical blade 34, except for and not including the swept-back leading edge 44, and yet enjoy a substantial increase in tip curl resistance as supported by the tests. The tests show that for the embodiment tested the swept-back leading edge portion 44 need only represent axial and radial cutbacks of the identical blade 34 extending for only about half of the experienced tip curl region 38 to be effective.

As illustrated in FIG. 3, the swept-back leading edge portion 44, shown in dashed line, represents only a portion of the tip curl region 38. In the preferred embodiment of the invention, the swept-back leading edge portion 44 extends from the first leading edge point 52, disposed radially at least 60% of the extent of the leading edge 40 from the root 46 to the tip 42, which corresponds to the 40% radial cutback and includes the 30% radial cutback which is disposed at 70% of such extent. The swept-back leading edge portion 44 preferably includes a slope which decreases in magnitude from the first point 52 to the tiP 42 at the second point 56. Although the profile of the swept-back leading edge portion 44 may be straight, in the preferred embodiment it is arcuate and has a continuously decreasing slope as indicated above. Also, in the preferred embodiment of the invention, the leading edge second portion 50 extending from the root 46 to the first point 52 is substantially straight. However, in other embodiments of the invention the leading edge second portion 50 could also be arcuate or have any other preferred profile as long as a swept-back leading edge portion 44 in accordance with the various objects of the invention is utilized.

Illustrated in FIG. 6A is a three-stripe mode shape 64 of the airfoil portion 26 having the swept-back leading edge portion 44 in accordance with the present invention. The mode shape 64 is analogous to the three-stripe mode shape 58 and includes three nodal lines 64a, 64b and 64c. It is noted that respective mode shapes of the airfoil portion 26 and the conventional airfoil portion 34 without the swept-back leading edge portion 44 are changed due to the cutback of the leading edge tip region, which results in the swept-back leading edge portion 44. In particular, the nodal lines 64a, 64b and 64c, which are analogous to the nodal lines 58a, 58b and 58c of the conventional airfoil portion 34 illustrated in FIG. 5A, have been repositioned. Of substantial importance, the nodal line 64a closest to the leading edge portion 44 has been repositioned to extend from a third point 66 on the leading edge 40 to a fourth point 68 on the blade tip 48 disposed aft of the second point 56. The nodal line 64a and the third and fourth points 66 and 68 have been superimposed on the airfoil portion 26 shown in FIG. 4 for improved visibility and comparison with other features thereof.

In the preferred embodiment, the third point 66 is also disposed radially outwardly of the mid span 54 of the airfoil portion 26. Also in accordance with the preferred embodiment, the profile of the swept-back leading edge portion 44 is convex outwardly or has a slope decreasing from the first point 52 to the second point 56, whereas the nodal line 64a is concave outwardly and has a slope increasing from the third point 66 to the fourth point 68. Accordingly, the profiles of the leading edge portion 44 and the nodal line 64a are generally opposite to each other and are generally aligned obliquely to each other.

FIG. 6B illustrates a top view of FIG. 6A and shows that the nodal line 64a now occurs in the tip 48 at the fourth point 68 located at a transverse thickness $t_2$ of about 0.051 inch, which is closer to the maximum thickness T than was the nodal line 58a illustrated in FIGS. 5A and 5B.

Accordingly, the introduction of the swept-back leading edge portion 44 has moved aft in the airfoil portion 26 the nodal line 64a to a position of greater airfoil thickness. With the nodal line 64a occurring at a thicker blade section, the resistance to bending is thereby also increased to improve the resistance to tip curling due to foreign objects.

The tip 48 illustrated in FIG. 6B has a chord length $C_2$, which is smaller than the analogous chord length $C_1$ and results in a maximum thickness to chord ratio $T/C_2$ of about 0.036. The airfoil portions 26 and 34 are relatively thin, since they have tip maximum thickness to chord ratios of no greater than about 0.04, which is substantially below a typical T/C ratio for turbine blades of about 0.126 for one type of turbine blade used in a high pressure turbine stage 1 position. The exemplary airfoil portion 26 is about 2.1 inches long, which further indicates its relative thinness, which leads to the problem of tip curl solved by the present invention.

Furthermore, the frequency of vibration associated with the mode shape 64 illustrated in FIG. 6A has increased substantially to about 17,485 Hertz, which thus reduces the period of one cycle of vibration so that the impact of a foreign object on the airfoil portion 26 operated at 42,000 rpm will therefore occur over greater than the one-quarter to one-half cycle experienced without the swept-back leading edge portion 44. Accordingly, since a foreign object impact occurs during more of the time in a single cycle of vibration, the extent of energy transferred to the blade is thereby reduced. In an optimum condition wherein a foreign object were to impact the airfoil portion during the entire period of one cycle of vibration, the tendency to excite the three-stripe mode shape 64 would be reduced or eliminated.

Inasmuch as the present invention was uncovered as a result of solving the problem of blade tip curl due to foreign objects, another feature of the invention is an improved method of forming a blade having means for increasing resistance to tip curl by repairing a gas turbine engine blade having an airfoil portion including a leading edge tip curl caused by foreign object damage.

Although, in a conventional bladed disk assembly, individual blades could be removed and replaced, this is not possible with the blisk 24, since the airfoil portions 26 are integrally formed with the rotor disk 28. In either situation, an economical method of repair which does not adversely affect aerodynamic performance is desirable.

Figure 7A:
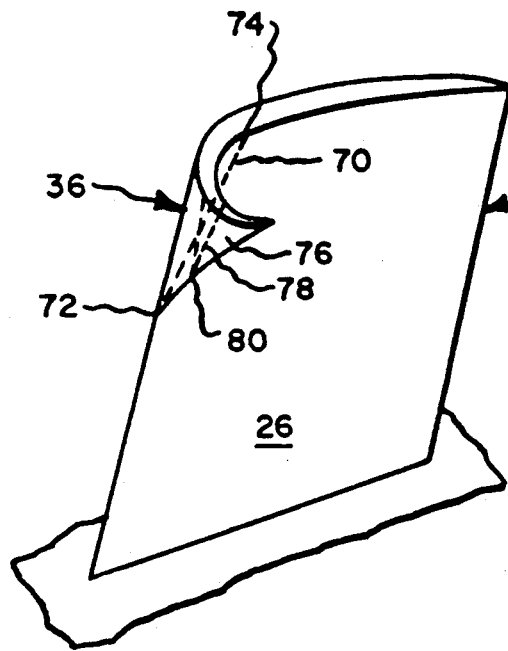
FIGS. 7A-7D are perspective views of a conventional airfoil portion having a tip curl undergoing a forming method to result in an airfoil portion having a swept-back leading edge in accordance with embodiments of the present invention.

Accordingly, one embodiment of the forming method in accordance with the present invention includes providing a damaged gas turbine engine blade 34 of the type having a tip of maximum thickness T and a chord length C and a T/C ratio of no greater than about 0.04, and having a leading edge tip curl 36, as illustrated in FIGS. 5B and 7A. In one embodiment, the method includes the step of removing (by conventional means including cutting) the entire tip curl 36 along a separation line 70 extending from a point 72 on the leading edge to a point 74 on the tip, which represents the base of the tip curl 36.

Figure 7C:
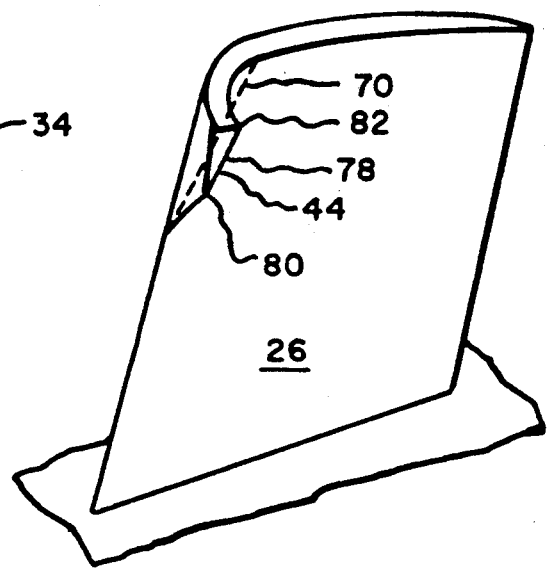
Figure 7B:
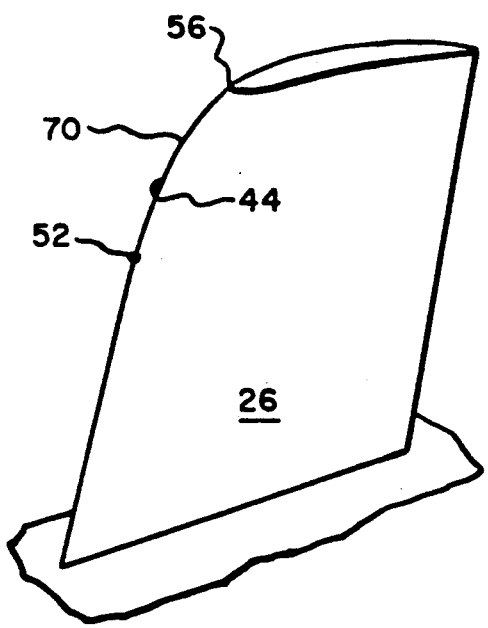

The method may then include a final step of shaping, by any conventional means including grinding, to an aerodynamically smooth convex contour the leading edge portion 44 formed along the separation line 70 by the removing step as shown for the resulting blade 26 in FIG. 7B, in which point 72 becomes the first point 52 and the point 74 becomes the second point 56.

In an alternate embodiment, the entire tip curl may not be removed to minimize changes to the blade by including a first step of removing a first portion 76 of the leading edge tip curl 36 along a separation line 78 as illustrated in FIG. 7A in dashed line by any conventional means including cutting or grinding. The removed portion 76 extends along the separation line 78, extending back from a point 80 on the leading edge to a point 82 on the tip 42. (See also FIG. 4.) FIG. 7C illustrates the resulting blade 26 after the removing step.

Figure 7D:
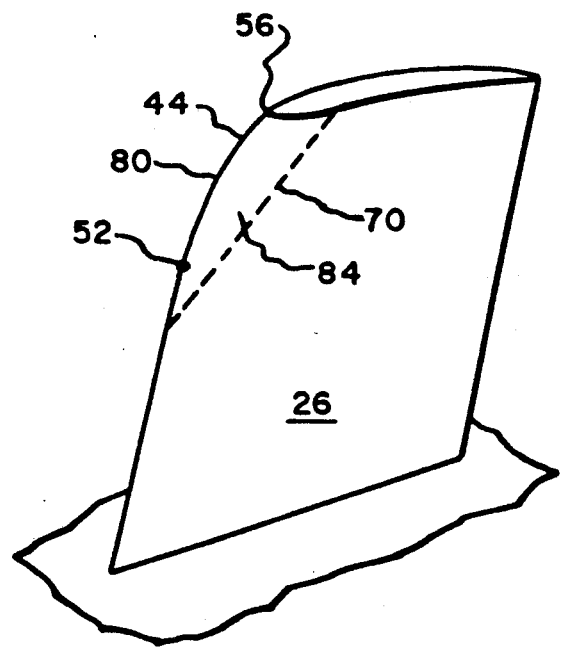

A second step comprises returning to an original position, i.e. the position before tip curling, a second portion 84 of the tip curl 36, which extends to the base line 70, remaining after the removing step as illustrated in FIG. 7D. This may be accomplished by bending the second portion 84 back to the original position. Depending upon the means used to remove the first portion 76 from the tip curl 36, the separation line 78 may form the swept-back leading edge portion 44 as substantially flat as illustrated in FIG. 7C and, therefore, may require an additional step of shaping to an aerodynamically smooth contour the leading edge portion 44 as illustrated in FIG. 7D. This may be accomplished by grinding, for example, to remove any flatness in the leading edge portion 44 to generate a generally outwardly convex and aerodynamically smooth leading edge profile as was originally found in the blade. As shown in FIGS. 7C and 7D, the point 80 becomes the first Point 52 and the point 82 becomes the second point 56.

The method is further characterized by the absence of any step for adding material to the leading edge to replace the material removed with the first portion 78 or the entire tip curl 36, which would be used to return the blade to an original undamaged shape. Adding such material would, of course, result in the original blade which was subject to tip curling. And any decrease in aerodynamic performance due to the absence of the removed material would be acceptable for the resulting increase in tip curl resistance.

Although an existing blade subject to tip curl can be repaired for increasing resistance to tip curl with a relatively minor change in leading edge tip contour, the invention may also be utilized in new blades. In a new blade design, the swept-back leading edge portion 44 can be originally designed in and the blade may also be designed to have an additional trailing edge portion 86, as illustrated in dashed line in FIG. 3, added to the trailing edge of the blade at the tip to offset the removal of the first portion 76. This may be desirable in certain applications to ensure that the chord lengths of the tip region of the airfoil portion 34 have the same length as they otherwise would without the use of the swept-back leading edge portion 44 so that the extent of the flow channel between adjacent airfoil portions 34 is maintained and meets other conventionally known design requirements.

While there have been described herein what are considered to be preferred embodiments of the present invention, other modifications of the invention shall be apparent to those skilled in the art from the teachings herein, and it is, therefore, desired to secure in the appended claims all such modifications as fall within the true spirit and scope of the invention.

More specifically, and for example only, the swept-back leading edge portion 44 may be used in conventional blades or blisks which are subject to tip curling due to any foreign objects. Although a convex swept-back leading edge portion 44 as above described is preferred, for example to ensure that foreign objects impact the airfoil portion 26 at a radially lower position having an increased thickness as compared to a concave swept-back leading edge portion which would allow foreign objects to impact the airfoil portion at a higher radial position where the airfoil is typically thinner, other profiles of the portion 44 may be chosen. The preferred profile and extent of the swept-back leading edge portion may be tailored relative to nodal lines which may exist at the leading edge-tip region of a blade for increasing resistance to foreign object damage.

Accordingly, what is desired to be secured by letters patent of the United States is the invention as recited in the following claims.

We claim:

1. A method of forming a gas turbine engine blade having an airfoil and means for increasing tip curl resistance thereof comprising the steps of:

providing a damaged gas turbine engine blade having an airfoil portion bounded by a root and a tip spaced radially apart, said tip having a chord length C and a maximum thickness T and a T/C ratio of no greater than about 0.04, and a leading edge and a trailing edge spaced axially apart, said leading and trailing edges extending from said root to said tip, said airfoil having a leading edge tip curl caused by foreign object damage, and;

removing said leading edge tip curl along a separation line extending back from a first point on said leading edge to a second point on said tip, without adding any material to replace said leading edge in tip curl removed in said removal step to return said blade to an original undamaged shape, thereby forming a gas turbine engine blade airfoil portion having increased tip curl resistance.

2. The method according to claim 1 further including shaping to an aerodynamically smooth contour a leading edge portion formed along said separation line by said removing step.

3. The method according to claim 1 wherein said first point is disposed radially outwardly at least about 60% of said airfoil portion from the root.

4. The method according to claim 3 wherein said second point is disposed axially up to about 15% from said first point relative to a chord of an airfoil section extending through said first point from said leading edge to a trailing edge of said airfoil portion.

5. The method according to claim 1 wherein said removing step comprises removing a first portion of said leading edge tip curl along said separation line and further including the step of returning to an original position a second portion of said tip curl remaining after said removing step.

6. A method according to claim 1 further including shaping to an aerodynamically smooth convex shape a leading edge portion formed along said separation line.

7. The method according to claim 5 wherein said original position returning step includes bending said tip curl second portion to said original position.

8. The method according to claim 7 further including shaping to an aerodynamically smooth convex shape a leading step portion formed along said separation line.

9. The method according to claim 1 wherein said separation line is straight.

10. The method according to claim 1 wherein said separation line is arcuate.

11. The method according to claim 1 wherein said damaged blade airfoil portion is integral with a rotor disk.

12. The method according to claim 1 wherein said damaged blade is removable from dovetail slots in a rotor disk.

* * * * *